United States Patent [19]
Jackson et al.

[11] Patent Number: 5,210,726
[45] Date of Patent: May 11, 1993

[54] TRACK SEEK METHOD UTILIZING AN IDEAL SIGNAL

[75] Inventors: Robert Jackson, Union City; Alan Burroughs, San Jose, both of Calif.

[73] Assignee: Maxoptix Corporation, San Jose, Calif.

[21] Appl. No.: 833,460

[22] Filed: Feb. 7, 1992

[51] Int. Cl.⁵ .................... G11B 17/22; G11B 7/00
[52] U.S. Cl. .................... 369/32; 369/44.28; 369/44.27
[58] Field of Search .......... 369/32, 44.28, 44.29, 369/44.27, 77.02, 44.25; 360/77.05, 78.04

[56] References Cited

U.S. PATENT DOCUMENTS 5,079,756  1/1992  Kuwabara .................... 369/44.28
5,117,408  5/1992  Weispfenning et al. ............ 369/32

Primary Examiner—Robert J. Pascal
Assistant Examiner—Ali Neyzari
Attorney, Agent, or Firm—Blakely, Sokoloff, Taylor & Zafman

[57] ABSTRACT

A track seek method for a disk drive system. In the seek method of the present invention, the head is moved according to the characteristics of an ideal, electronically generated signal which is independent from data read off the disk. By varying the characteristics of the ideal signal, the seek profile is controlled. The ideal signal is sampled at times specified by an error signal which is based upon data read off the disk. The movement of the head is adjusted according to the sampled signal. Since track crossings correspond to ideal signal cycles, the number of tracks crossed is determined by counting the number of cycles of the ideal signal. Consequently, the position of the head is known at all times throughout the seek, thereby maintaining the seek in a closed-loop configuration during the entire seek. When the appropriate number of tracks have been counted, the head is stopped on the destination track and the head can access data contained therein. Furthermore, the seek operation's dynamic range may be increased by extending the range of each cycle of the ideal signal to cover more than one track.

23 Claims, 4 Drawing Sheets

LIGHT BEAM POSITION/SEEK BLOCK DIAGRAM

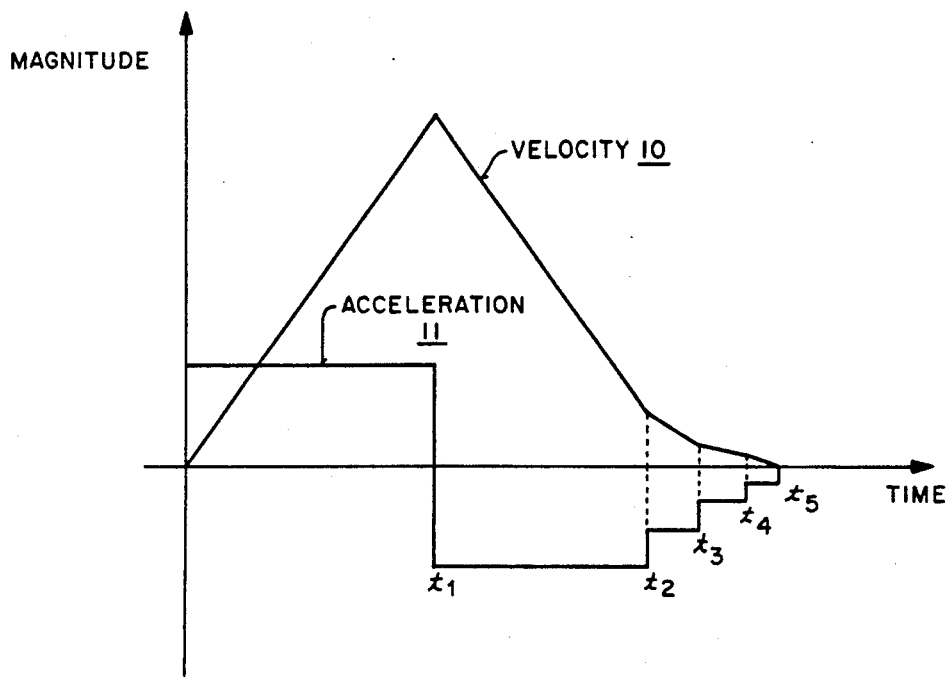
FIG _1
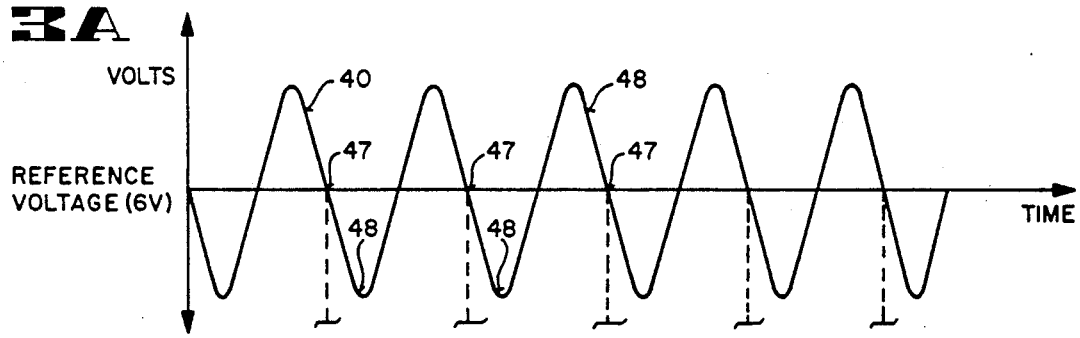
FIG 3A
FIG 3B
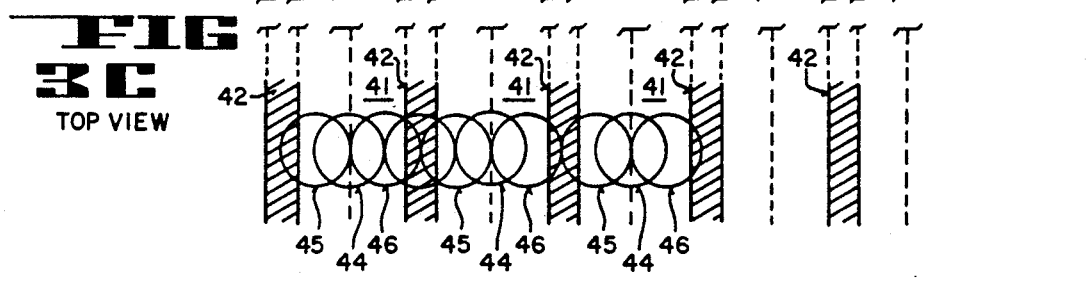
FIG 3C

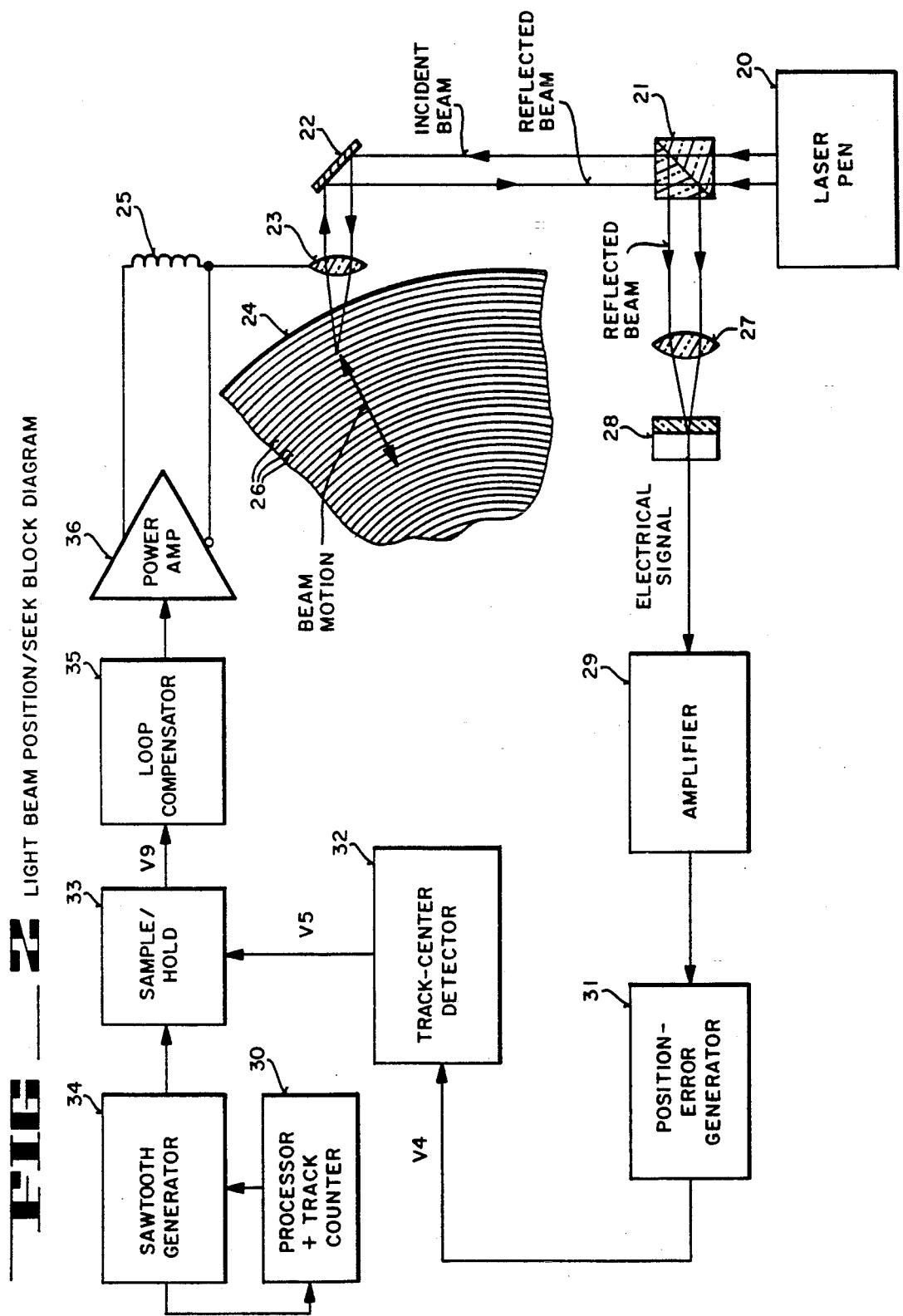
FIG—2 LIGHT BEAM POSITION/SEEK BLOCK DIAGRAM

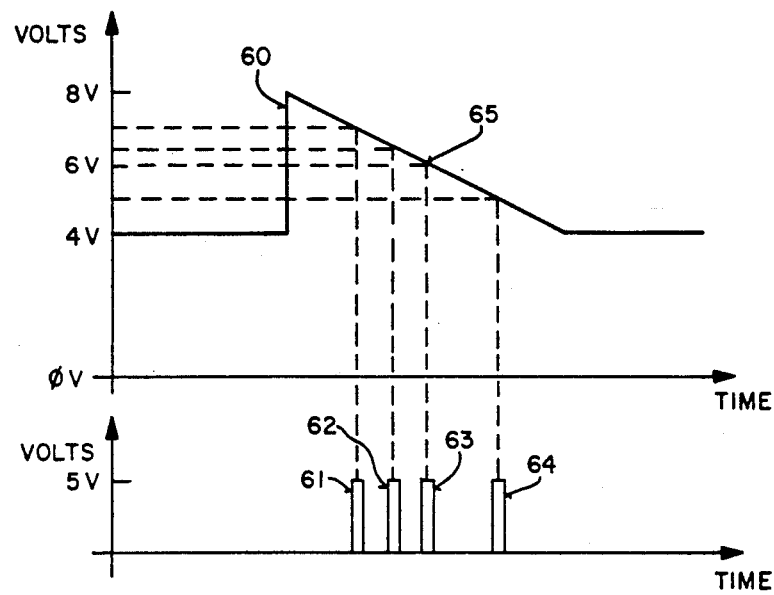
FIG_4
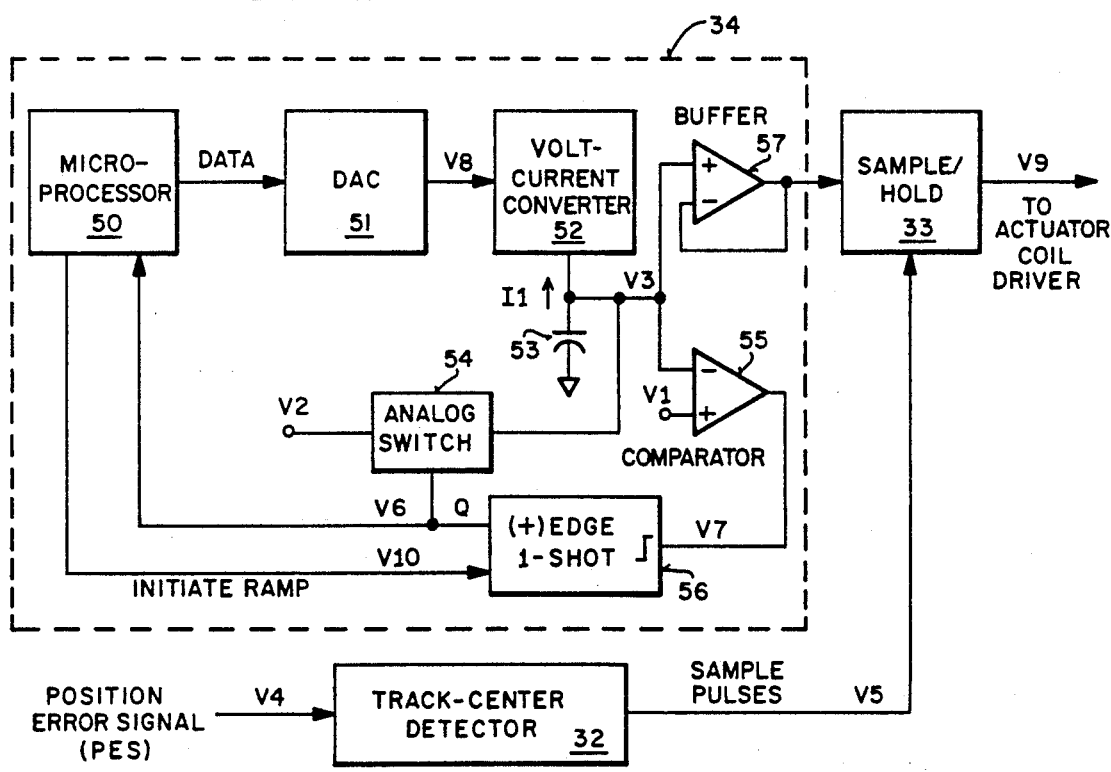
FIG_5

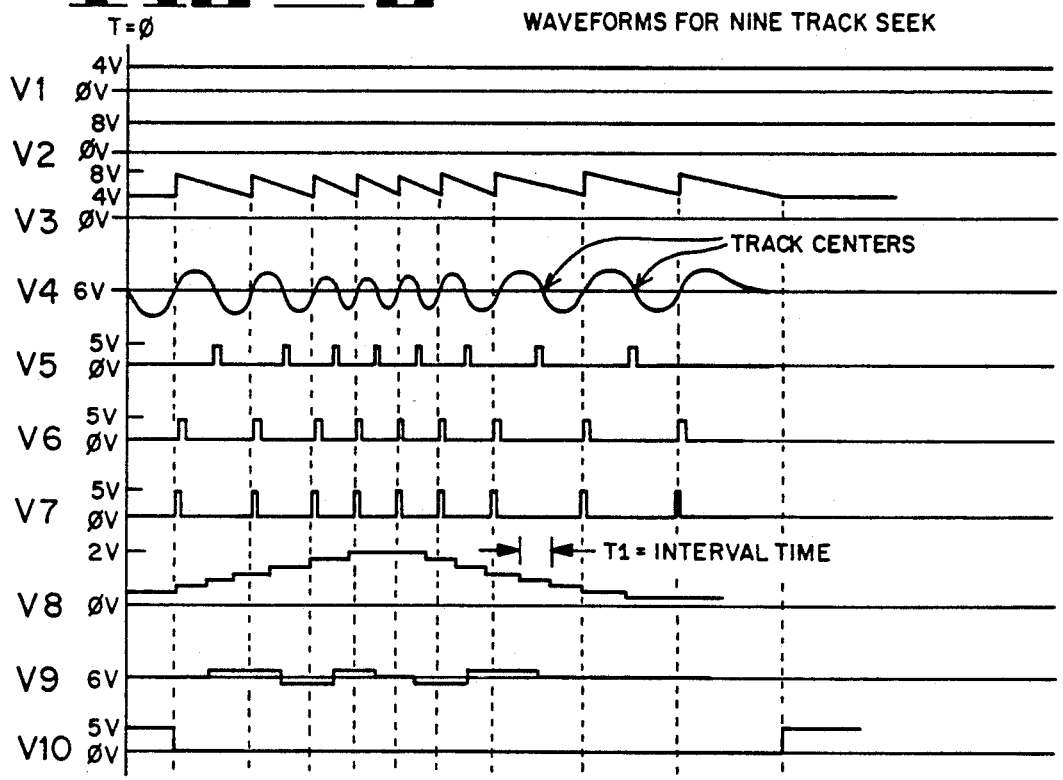
FIG_6
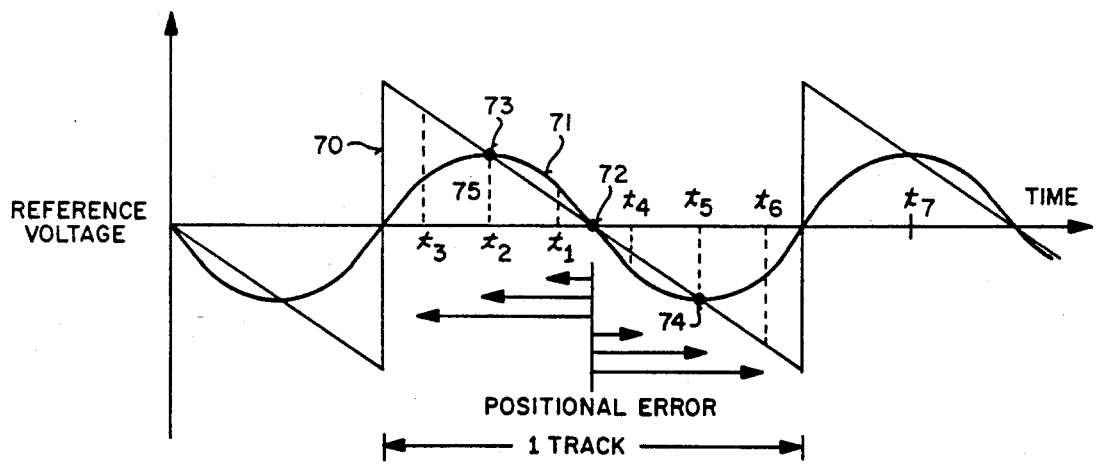
FIG_7
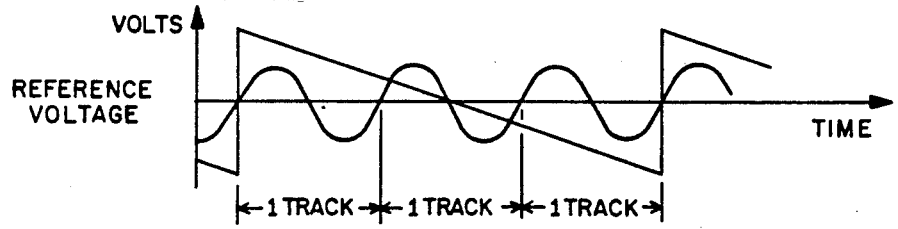
FIG_8

TRACK SEEK METHOD UTILIZING AN IDEAL SIGNAL

FIELD OF THE INVENTION

The present invention relates to the field of disk drive recording systems. More specifically, the present invention is a track seek method wherein the head is forced to follow an ideal signal which is independent from data derived from the disk. By varying the characteristics of the ideal signal, the seek profile, head position, and dynamic range may be controlled.

BACKGROUND OF THE INVENTION

In the field of computer systems, data is typically stored on magnetic or optical disk drive systems as a series of binary bits. A "head" is used to read and write these bits off and onto a circular data disk. In the present invention, a head refers to any suitable means for either accessing data from or storing data onto a storage medium (e.g., a magnetic transducer for magnetic disk drives, a lens assembly for optical disk drives, etc.). The circular disk is rotated about a spindle.

A servomechanism is used to locate the head in reference to fixed radial locations over the disk surface. The servomechanism is also used to reposition the head from one radial location to another location. Thus, as the head is sequentially moved radially across the spinning data disk, a number of concentric or spiral rings are described. These rings, on the surfaces of which binary bits are recorded, are referred to as "tracks".

When the computer directs the disk drive to position the head on a track different from the track wherein the head is presently positioned, this is known as a "seek". Typically, the user or the computer program reads from or writes onto the disk a number of times per operation. In addition, data is frequently written onto these tracks in a random manner. Thus, a number of seeks are often required for each disk access. Since data cannot be written onto nor read from the disk during the period of the seek, it is important that the seek be completed as rapidly and efficiently as possible.

One common practice is to manufacture disks so that they are preformatted with embedded servo information. Each track is divided into sectors which contain unique header addresses. Thus, as the head is positioned over a particular sector, the disk drive can read this address to determine the current position of the head.

It is possible that the seek can be accomplished by moving the head and reading each preformatted sector address as they are encountered, in order to determine whether the head has reached the destination track. However, one major disadvantage with this seek method is that it requires a relatively long period of time for reading the header data and comparing it with the destination track number to determine whether the seek has been completed.

In the prior art, a faster seek scheme involves applying maximum acceleration to the head for an initial period of time until the seek's approximate midway point is reached and then applying maximum deceleration. This is known as open-loop operation because the head position information is not looped back to the disk drive system. By operating the disk drive servo in this type of open-loop configuration, the head is positioned close to the desired track relatively quickly.

The disadvantage is that while seeking with the tracking servo loop open, the disk drive may lose its exact location in reference to the disk's track number. Thus, towards the end of the seek, the disk drive must access the disk to re-establish the position servoing. In essence, the servo loop must be reclosed, which takes time. Based on the information read from the preformatted sector address, the head is moved with the position loop closed, until the desired track is reached.

In short, the major part of the prior art seek scheme is done as a calculated guess—the exact position is then determined, and the head is finally repositioned to the correct track in reference thereof. Even though this seek scheme is relatively quick, it requires two stages. Thus, what is needed is a direct single stage seek scheme wherein the servo positioning loop is kept closed throughout the entire seek, so that the location of the read/write head is known at all times without having to constantly check the embedded sector addresses. Thereby, the destination track can be arrived at precisely without any overshoot or undershoot.

In the prior art, the position of the head was determined by determining its initial position and counting the number of tracks which had been crossed. However, with the prior art approach, the track crossing information is read off the disk. The problem is that the track crossing signal is typically discontinuous due to noise, defects inherent in the disk itself, and errors caused by the preformatted sectors. Consequently, these discontinuities often led to erroneous track crossing readings so that the position of the head was often incorrect. This problem is exacerbated in optical disk drive systems. In optical disk drive systems, the amplitude of the track crossing signal is relatively small and tends to fluctuate, depending on the focus of the light beam. Thus, in prior art optical disk drive seek methods, the track crossing signal is unreliable.

Another disadvantage with the prior art seek method is the manner by which seek profiles are implemented. A seek profile describes the trajectory of the head. FIG. 1 shows a profile for a typical seek. Typically, a profile defines the magnitude of the velocity 10 or acceleration 11 of the head as a function of time. For example, for a 100 track seek, the head would be subjected to a high constant rate of acceleration until the approximate halfway point is reached. In the example, this corresponds to 50 tracks. The time for this is denoted by $t_1$. With constant acceleration, the velocity 10 increases linearly. Next, the head is decelerated for a specified amount of time (from $t_1$ to $t_5$). The deceleration occurs in numerous steps ($t_2$–$t_5$). The deceleration occurs in steps in order to minimize the mechanical resonances of the armset holding the head. The slope of velocity 10 decreases correspondingly. The velocity decreases until the head comes to a stop at $t_5$. The head should have been moved approximately 100 tracks and should now be close to the destination track.

The velocities, accelerations, times, etc. for a given profile are predetermined based on mathematical calculations. For each seek of different length, there exists a corresponding profile. These profiles are typically stored in look-up tables which are burned into Read Only Memory (ROM) chip. For each seek, the corresponding profile must be looked up and followed. As such, one disadvantage with this scheme is that it is inflexible and requires storing an extensive look-up table. What is needed is a seek scheme having the capability of following various profiles simply by changing a few lines of software code.

Furthermore, prior art seek methods are typically limited to a dynamic range of plus-or-minus half a track. A servo position error of greater than half a track on either side of track center will typically cause the seek to fail. The reason for this failure is that the next track cycle has already started. Given that a track width can be as thin as 1.5 μm, it does not take much disturbance to cause the seek to fall outside this half track dynamic range.

SUMMARY AND OBJECTS OF THE INVENTION

In view of the problems associated with prior art seek schemes, one objective of the present invention is to provide a direct, single stage seek method.

Another objective is to keep the servo positioning loop closed throughout the entire seek, so that the location of the head is known at all times and the destination track can be arrived at precisely, without overshoot or undershoot.

Another objective of the present invention is to reliably count the number of track crossings.

Another objective of the present invention is to follow a seek profile according to software code, rather than a look-up table.

Yet another objective of the present invention is to increase the dynamic range of the seek operation.

These and other objects of the invention are provided for by the present invention. The seek is performed in a direct, single stage wherein the servo loop is kept closed throughout the entire seek. The disk drive system initiates the seek by generating an ideal signal which is independent from information derived from the disk. The head is forced to follow the characteristics of this ideal signal. For each cycle of the ideal signal, the head is forced to move across one track. Hence, by varying the period of the signal, the velocity of the head can be controlled. The rate by which the period is varied controls the acceleration of the head. Thereby, the seek profile can be controlled by varying the frequencies of the ideal signal.

Since the head is forced to cross one track per cycle, the number of tracks presently crossed can be determined by simply counting the number of cycles of the ideal signal. Because the starting track number is known and the number of tracks crossed is known at all times, the position of the head is known throughout the entire seek. The head arrives precisely at the destination track by stopping the head once the appropriate number of tracks have been counted.

The ideal signal is sampled at certain times specified by a Position Error Signal (PES). Each time the PES crosses a reference voltage and has the proper polarity of slope, this indicates that the head (or light beam for optical disk drives) is physically placed over the center of a track. When this occurs, the ideal signal is sampled to determine whether it corresponds to track center. If the sampled ideal signal does not correspond to track center, then the head movement is adjusted by either increasing or decreasing its velocity accordingly. This is accomplished by varying the amount of current supplied to the tracking motor coil.

In an alternative embodiment, the dynamic range of the seek operation is extended by extending the range of the ideal signal so that each cycle encompasses more than one track.

Other objects, features, and advantages of the present invention will be apparent from the accompanying drawings and from the following detailed description.

BRIEF DESCRIPTION OF DRAWINGS

The present invention is illustrated by way of example and not limitation in the figures of the accompanying drawings, in which like references indicate similar elements, and in which:

FIG. 1 is a profile for a typical seek.

FIG. 2 is a block diagram of an optical disk drive system of the preferred embodiment of the present invention.

FIG. 3a is a graph of a sample Position Error Signal as a light beam is moved across tracks in an optical disk.

FIG. 3b is a cross-sectional view of an optical disk with each track in reference to the PES signal.

FIG. 3c is a top view of an optical disk as the focus spot of the light beam is moved across the tracks.

FIG. 4 shows a ramp and four pulses occurring at four different possible times representing four possible locations of a light beam in reference to a track on an optical disk.

FIG. 5 is block diagram of one embodiment of a sawtooth waveform generator and track counter.

FIG. 6 is a signal and timing diagram for 10 points on the circuit for one embodiment of the present invention.

FIG. 7 is the graph of one ramp and one cycle of a PES signal, both of which represent one track in an optical disk.

FIG. 8 shows one alternative embodiment of the present invention whereby the range of one ramp is extended to three tracks, resulting in increased dynamic range.

DETAILED DESCRIPTION

An apparatus and method for a direct single stage track seek scheme by following an ideal, electronically generated signal is described. In the following description, numerous specific details, such as the voltages, frequencies, waveforms, etc., are set forth in order to provide a thorough understanding of the present invention. It will be obvious, however, to one skilled in the art that these specific details need not be used to practice the present invention. In other instances, well-known structures and circuits, have not been shown in detail in order not to unnecessarily obscure the present invention. The following detailed description is made in reference to an optical disk drive. However, it would be apparent to one skilled in the art that the present invention can readily be applied to magnetic disk drives as well.

In the present invention, the seek is performed in one closed-loop stage. A lens assembly is moved according to an ideal, electronically generated signal. Although this signal can be generated outside of the disk drive, in the preferred embodiment, it is generated internal to the disk system. The lens assembly causes a light beam, which is used to read the data off the optical disk, to cross a number of tracks. The present invention counts the number of tracks that had been crossed. As each track is crossed, this count is incremented. In this manner, the position of the light beam is known during the entire seek. Once the correct number of tracks have been counted, the read/write head comes to a rest at the desired track to be accessed. Furthermore, the present invention allows certain seek parameters such as seek velocity and acceleration to be controlled simply by varying the characteristics of the ideal signal.

FIG. 2 shows a block diagram of an optical disk drive system utilizing the present invention. Laser pen 20 generates a collimated light beam which passes through a beamsplitter 21. The incident beam out of beamsplitter 21 is deflected off mirror 22 and passed through lens assembly 23. Lens assembly 23 focuses the incident beam onto optical disk 24. Tracking motor coil 25 controls the movement of lens assembly 23 so that the focused light beam may radially sweep across tracks 26.

Parallel grooves arranged within tracks 26 modulate and reflect the light beam back through lens assembly 23. This modulated light beam is reflected back through beamsplitter 21 and focused by lens 27 onto a pin-diode detector array 28. The pin-diode detector array 28 produces an electrical output signal which is dependent on the position of the beam relative to tracking grooves of the reflected light beam. This electrical signal is then amplified by amplifier 29.

The amplified signal is also supplied to a position-error generator 31 which uses the amplified signal to generate an error signal, the Position Error Signal (PES), V4. The PES is periodic sinusoidal signal and is a function of the relative difference of the positions of the beam to the nearest track center. FIG. 3a shows a sample PES signal 40 in reference to FIG. 3b and 3c. FIG. 3b is a cross-section of the optical disk. Individual tracks 41 are bordered on each side by grooves 42. The centerline of each track 42 is given by point 43. FIG. 3c is a top view of an optical disk as the focus spot of the light beam is moved across tracks 41. Shaded portions 42 represent the grooves bordering each track 41. Focus spots 44 represent the instances wherein the read/write head positions the focus spot at the center of tracks 41. Likewise, focus spots 45 and 46 represent the instances when the focus spot is moved left and right of track center.

The PES signal 40 is derived from the variations in the reflected beam due to the distances that the focus spot is off track center. When the focus spot is positioned in the center of a track 43 or groove 42, this corresponds to a PES signal equal to a reference voltage as shown by points 47. As the focus spot is moved away from the centerline 43 and towards track boundaries 42, the amplitude of the PES signal increases. Points 48 depict the maximum amplitude of the PES signal 40.

The PES signal is used for both track seeking and track following. In track seek mode, the present invention uses the error signal as a trigger to determine the times at which to examine the ideal sawtooth waveform from the sawtooth generator and track counter 34. The PES signal is coupled to a track center detector 32 which determines the instances when the focused beam is positioned in the center of a track. Track center detector 32 bases this determination on the PES signal. At track center, track center detector 32 generates a sample pulse. The sample pulse trigger sample/hold circuitry 33.

Once triggered, sample/hold circuitry 33 samples the voltage of the ramp generated from the sawtooth generator 34. The sampled ramp voltage is proportional to the position error. Based upon this sampled voltage, loop compensator 35 determines how much current is required it drive tracking motor coil 25. Power amplifier 36 is then used to amplify the signal out of loop compensator 35 to tracking motor coil 25. Depending on the current supplied by power amplifier 36, tracking motor coil 25 moves lens assembly 23 to rectify the position of the light beam to where it should be at that moment. This process is repeated until the light beam arrives on track.

Thus, if the light beam is behind in time, then the current is increased to boost the velocity of lens assembly 23. Likewise, if the light beam is ahead in time, then the current is decreased and lens assembly 23 slows down. FIG. 4 shows a ramp 60 along with pulses 61–64, which represent the possible times in which the sample pulse, V5, might occur. The sample pulse, V5, represents the actual instance wherein the light beam is positioned over the center of a track. When a sample pulse is generated, sample/hold circuitry 33 samples the voltage of ramp 60 at that time. If the light beam were on track, this would occur at the midway point 65 of ramp 60. The ramp voltage sampled at that time would be 6.0 volts. Thus, loop compensator 35 keeps the same current flowing through tracking motor coil 25, since the seek is on track.

However, if sample pulse 62 had occurred, this signifies that track center pulse V5 is ahead of time. Instead of sampling 6.0 volts, sample/hold circuitry 33 samples 6.0 volts. Because the sampled voltage is now half a volt higher than the optimal 6.0 volts, this signals loop compensator 35 to decrease the current through tracking motor coil 25, thereby slowing down the light beam. Likewise, if zero crossing sample pulse 61 had occurred, it can be seen that track center pulse is even more ahead of time than the previous situation. As expected, the sampled ramp voltage is now 7.0 volts. Based on this voltage, loop compensator 35 will decrease the current event more than in the previous situation, to slow down the light beam. Conversely, if sample point 64 had occurred, it would mean that track center pulse, and hence, the light beam is behind in time. The sampled voltage would be 5.0 volts. Since this is below the nominal track center voltage of 6.0 volts, loop compensator 35 will increase the current through tracking motor coil 25 to speed it up.

The output of the sawtooth generator 34 is also sent to processor and track counter 30 which counts the number of tracks crossed. In this manner, the track seek is done according to an ideal, electronic signal generated by the sawtooth generator 34 and processor 30. Typically, track crossing information (PES) is read off the disk and is subject to extraneous noise interferences, groove defects within the track itself, and cases wherein the PES signal is broken up by preformatted data. Instead of sampling this non-ideal, discontinuous signal and using it to seek with, the present invention samples the ideal, electronically generated signal from the sawtooth generator 34 and processor 30. The discontinuous PES signal is used to determine the appropriate times to sample the ideally generated sawtooth waveform. These sample times occur when the PES signal crosses a predetermined reference voltage level with the correct slope. These correspond to track centers. Consequently, variations of the amplitude of the PES signal during the seek have minimal effects on the servo loop dynamics of the present invention. As long as the track center points are correct, the limitations of the PES signal (e.g., PES nonlinearity, media effects, lens focus, noise, etc.) have minimal effect on the present seek method.

FIG. 5 is a block diagram of the sawtooth generator and track counter. First, two voltages are set at a predetermined level. These two voltages, V1 and V2, define the lower and upper voltage limits, respectively, of the sawtooth waveform. In one embodiment, V1 is set at 4 volts and V2 is set at 8 volts. However, it should be noted that V1 and V2 can be set to a wide range of different voltages without impairing the operation of this seek scheme.

The sawtooth waveform is comprised of a series of ramps. In the currently preferred embodiment, a decreasing ramp is utilized. An instantaneous voltage rise from some reference voltage V1 is followed by a steady linear decline back to the reference point V1. However, it would be obvious to one skilled in the art that the present invention could also be operated by an increasing ramp, where the voltage linearly increases from some reference point which is then followed by an instantaneous voltage drop.

There are numerous methods known in the prior art for generating ramps and sawtooth waveforms. For the present invention, it is not critical which of these methods are used so long as the sawtooth waveform characteristics can be controlled. In the currently preferred embodiment of the present invention, the first ramp is initiated by microprocessor 50 (National Semiconductor HPC Plus S/N 46100) via signal V10. Digital data is sent by microprocessor 50 to a digital-to-analog converter (DAC) 51. This digital data is converted to an equivalent analog voltage, V8, by DAC 51. The output voltage, V8, from DAC 51 is fed into a voltage-current converter 52. Voltage-current converter 52 converts voltage V8 into a current, I1, which is applied to capacitor 53. The initial voltage across capacitor 53 will be set by the voltage, V2, which is supplied through analog switch 54 at the start of each ramp. The initial voltage will steadily discharge through capacitor 53. The ramp is generated by the voltage, V3, across capacitor 53. In the presently preferred embodiment, capacitor 53 has a value of 470 picofarads.

V3 will continue to decrease until it reaches a voltage, V1. Comparator 55 compares the ramp voltage, V3, against V1. If the two voltages are the same, then comparator 55 sends an edge, V7, to an one-shot device 56. When the one-shot device 56 receives an edge V7, this signifies that the bottom threshold of the ramp has been met. The one-shot device 56 then generates a ramp reset pulse, V6. Ramp reset pulse, V6, is sent to both analog switch 54 and microprocessor 50. When analog switch 54 receives a ramp reset pulse, it again loads capacitor 53 with the initial voltage, V2, to initiate the generation of another ramp. The sawtooth waveform is essentially a series of ramps generates in this manner. It is buffered by buffer 57 and then sent to the sample/hold circuit 33. The sampled sawtooth waveform is passed through loop compensator 35, power amplifier 36, and ends up controlling tracking motor coil 25. In this manner, tracking motor coil 25 forces lens assembly 23 to move the light beam as dictated by the electronically generated, ideal sawtooth waveform.

Microprocessor 50 counts the number of ramp reset pulses, V6, received from the one-shot 56. Each ramp reset pulse constitutes one ramp. Since each ramp corresponds to the light beam moving across one track, the number of tracks crossed can be determined simply by counting the number of ramp reset pulses. Microprocessor 50 does this by incrementing a register for each received ramp reset pulse. In this manner, the disk drive knows how many tracks had been crossed at each point of the seek. Since the starting point was already known, the disk drive now knows the position of the light beam for all moments of the seek.

Microprocessor 50 can be instructed to either increase or decrease the DAC value. As microprocessor 50 increases or decreases the value of the DAC 51 output voltage, V8, increases or decreases proportionally. This, in turn, causes a proportional increase or decrease in the current fed into capacitor 53 from voltage-current converter 52. By varying the current through capacitor 53, the gradient of the ramp can be controlled. That is, the more current fed through capacitor 53, the higher the ramp's gradient will become. As the gradient increases, the period of the ramp will shorten.

Note that each period of the sawtooth waveform corresponds to crossing over one track. In other words, the radial movement of the light beam as it crosses over tracks on the optical disk is locked onto the sawtooth waveform. One effect is that as the period of the sawtooth waveform is decreased (i.e., increased frequently), the amount of time for the light beam to cross a track is proportionally shortened. The light beam must move faster (i.e., higher velocity). Thus, by simply varying the frequency of the sawtooth waveform, the velocity and trajectory profile of the light beam can be controlled.

Consequently, in the present invention, the velocity of lens assembly 23 is known virtually at each moment throughout the entire seek. Because the light beam is forced to follow the sawtooth waveform, the trajectory profile may be controlled by simply controlling the frequency of the sawtooth waveform. The faster the ramps become, the faster the light beam has to be moved in order to keep up. By adding lines of code to instruct microprocessor 50 to vary the frequency of the sawtooth waveform, the velocity at which the light beam is moved is thereby controlled. The acceleration may also be controlled by varying the update rate of the DAC 51. In the presently preferred embodiment, the acceleration is set at 110 m/sec$^2$. Thus, with the present invention, there is no need for extensive look-up tables in order to follow differing profiles.

Furthermore, in the currently preferred embodiment, because microprocessor 50 is not required to do time-consuming operations during the seek, a dedicated processor to do the seek function is not required. Hence, microprocessor 50 may be shared and can perform both seek operations and other regular disk drive functions as well.

An Example of a Nine Track Seek

An example of a nine track seek will now be made in reference to the signals and timing diagram shown in FIG. 6. Ten voltages V1–V10 are given as a function of time for various points of the circuit of the embodiment given by FIG. 5 At t=0, the seek is initiated. A feedforward current is sent to the tracking motor coil. The first ramp is started at a preset time after t=0. The preset time is determined by the magnitude of the feedforward current.

Referring back to FIG. 5, it can be seen that V1 is an input voltage to comparator 55. For this embodiment, V1 has been set to a continuous 4 volts. V1 defines the lower level of the sawtooth waveform. Likewise, V2 is also an input voltage. It is input into analog switch 54. For this embodiment, V2 has been set to a constant 8 volts. V2 defines the upper level for the sawtooth waveform.

V3 is the voltage across capacitor 53. As capacitor 53 charges and discharges, the voltage across capacitor 53, V3, defines the sawtooth waveform. FIG. 6 shows 9 ramps. Since the light beam is forced to cross one track per ramp in this embodiment, the nine ramps shown for V3 depicts a 9 track seek. The shorter the period of the ramp, the faster the light beam must move because it must cross the same track width in a shorter amount of time. Thus, it can be seen from FIG. 6 that the periods for each successive track decrease until approximately track 5, whereupon the track periods successively increase. This corresponds to initially accelerating lens assembly 23 and then decelerating midway. The velocity for lens assembly 23 increases for approximately the first 4.5 tracks then decreases thereafter.

The PES signal, V4, output from the position error generator is also shown in FIG. 6. V4 is a sinusoidal signal with each cycle representing one track. Given a symmetrical sinusoid and the fact that each cycle represents one track, the point where V4 crosses the reference line with negative slope (approximately in the midway point of each cycle) represents the center of the track. In this embodiment, it can be seen that, like the sawtooth waveform, the frequency first increases and then decreases. Similar to the sawtooth waveform, this represents an initial increase in velocity (acceleration) up to the approximate midway point of the seek, followed by the velocity being decreased (deceleration). V4 has nine cycles for a nine track seek, one cycle per track.

Track crossing detector 32 tests the slope of V4 and determines if V4 has crossed a reference voltage. In the current embodiment, the reference voltage level is six volts. If the slope of V4 is negative and V4 is equal to the reference voltage of 6 volts, track crossing detector 32 outputs a 5.0 volt pulse on V5. Thus, the V5 pulses represent the times when the light beam is positioned on the center of a track. It can be seen in FIG. 6 that V5 is comprised of a series of five volt pulses. There are eight pulses. These pulses are used to trigger sample/hold circuitry 33 to sample the ramp voltage. The ramp voltage is sampled in order to determine whether the light beam is trailing, leading, or at the correct position where it should be for that instance.

Comparator 55 compares the sawtooth waveform voltage, V3, with V1 (4 volts). If they are equal, comparator 55 generates a positive 5 volt edge on V7. In essence, V7 remains at 0 volts until the end of a ramp is reached, at which point, comparator 55 outputs a 5 volt edge on V7. When the one-shot 56 detects an edge on V7, it generates a 5 volt pulse on V6 to drive both analog switch 54 and microprocessor 50. Analog switch 54 uses the V6 pulse to recharge capacitor 53. Microprocessor 50 counts the number of V6 pulses to determine how many tracks had been crossed. For each track crossed, there is a corresponding V6 pulse. Thus, microprocessor 50 knows the position of the light beam throughout the entire seek. With the present invention, there is no need to reclose the position loop because the servo is run closed-loop during the entire seek.

V8 is the analog voltage out of the digital-to-analog converter 51. V8 is directly affected by the DAC value from microprocessor 51. The interval time, T1, is the time between the DAC updates by microprocessor 50. In this embodiment, the update interval is approximately ten microseconds. It would be obvious to those skilled in the art that other interval times may be used instead. As the DAC value is incremented, the V8 voltage proportionally increases. This causes more voltage to be input into voltage-current converter 52 which increases the current through capacitor 53. The more current that flows through capacitor 53, the steeper the gradient of the ramp becomes. Thus, it can be seen in FIG. 6 that as V8 is increased up to the midway point of the seek, the slope of the ramps get successively steeper. This corresponds to a shorter period which makes the light beam move faster. As microprocessor 50 decrements the DAC value, the V8 voltage decreases, thereby increasing the ramp periods.

V9 gives the ramp voltage that was sampled by sample/hold circuitry 33 when triggered by the sample pulses, V5, out of track crossing detector 32. Sample/hold circuitry 33 holds the sampled voltage until the next trigger. The voltage level of V9 determines the actual position of the light beam in reference to where it ideally should be. Based on the voltage of V9, the appropriate current is supplied to tracking motor coil 25 in order to position the light beam to where it should ideally be at that moment in the seek. Signal V10 is used to time the start of ramp V3 to correspond to the first groove center crossed.

Preserving the Servo Error Polarity

In the present invention, the servo error polarity is properly preserved. FIG. 7 is the graph of one ramp 70 and one cycle 71 of the PES signal, both of which represent one track in an optical disk. Track center is represented by the midway point 72 of ramp 70 and sinewave 71. Ideally, the light beam should be located at track centerpoint 72 when sampled. However, due to certain physical limitations, the light beam might be erroneously positioned on either side of track centerpoint 72. Sample times $t_1$–$t_6$ indicate six possible error situations. In $t_4$–$t_6$, the light beam lags behind where it ideally should be at that moment (i.e., track center 72). In $t_1$–$t_3$, the light beam is ahead of where it ideally should be at that moment.

It is apparent from FIG. 7 that as the positional error increases, the amplitude of PES 71 also increases in relationship to the reference voltage. For leading positional errors, the amplitude is positive. For lagging positional errors, the amplitude is negative. This relationship holds true until points 73 and 74 are reached. Points 73 and 74 represent the maximum positive and negative amplitudes, respectively, of PES signal 71 in relationship to the reference voltage. Beyond points 73 and 74, the amplitude of PES signal 71 decreases even though the positional error continues to increase. Thus, beyond points 73 and 74, PES signal 74 no longer correctly represents the magnitude of the positional error.

This phenomenon occurs because of the change in the polarity of the slope of PES signal 71 at points 73 and 74. The slope of PES signal 71 is negative in between points 73 and 74. Thus, the amplitude of the PES signal increased proportionally as the positional error increased. However, beyond points 73 and 74, the slope of PES signal 71 becomes positive. Thus, the problem arises in that the amplitude PES signal 71 decreases even though the positional error is increasing.

The present invention bypasses this phenomena by basing the servo positional error on ramp 60 instead of PES signal 71. It can be seen in FIG. 7 that the amplitude of ramp 70 in relationship to a reference voltage is proportional to the positional error. The slope of ramp 70 remains constant. Thus, the amplitude of ramp 70 correctly represents both the leading and lagging positional errors for the entire track. The amplitude of ramp 70 is given in terms of voltages. In the currently preferred embodiment, these sampled ramp voltages are used to rectify the positional error by controlling the amount of current flowing through the tracking motor coil.

An Alternative Embodiment for Increasing the Dynamic Range of the Seek

In the current embodiment, the dynamic range of the seek is plus-or-minus half a track. A position error of greater than half a track on either side of track center will cause the seek to fail. The reason for its failure is that the next track cycle has already started. For example, referring back to FIG. 7, if the positional error were three-quarters of a track to the right of track center (represented by t7), the seek scheme would misinterpret it to be one-quarter of a track to the left of track center. So, instead of correctly slowing down the light beam, the seek scheme aggravates the positional error by increasing the light beam.

In an alternative embodiment of the present invention, the dynamic range is increased by extending the ramp to cover more than one track. One method for accomplishing this is to increase the upper and lower limits of the ramp voltage and change the number of tracks per ramp cycle. For example, one alternative embodiment is to extend the range of the ramp to three full tracks. In other words, one ramp cycle now represents three tracks. This is shown in FIG. 8. Only every third zero-crossing is used to trigger the sample/hold circuitry. The other zero-crossings are gated out. By extending the ramp to cover three tracks instead of just one, the dynamic range is extended from plus or minus half a tack to plus-or-minus one and a half tracks. Thus, the dynamic range is effectively tripled. In other embodiments, the dynamic range can further be increased by extending the range of the ramp to cover even more tracks.

Thus, in an optical disk drive system, a single stage, closed-loop seek method and apparatus wherein the seek follows an ideal, electronically generated signal, has been described.

What is claimed is:

1. In a disk storage system comprising a rotating disk having a plurality of tracks for storing digital data which can be accessed by a transducer for reading and writing said digital data to and from said disk, a method for performing a seek wherein said transducer is moved from a starting track to a destination track, said method comprising the steps of:
   determining a location of said starting track;
   generating a first periodic electrical signal which is not derived from any information stored by said disk;
   moving said transducer at a velocity according to a period of said first signal;
   generating a second periodic electrical signal having an amplitude proportional to a distance of said transducer to a track center;
   sampling said first signal when said transducer is positioned over said track center as specified by said second signal;
   adjusting said velocity of said transducer based on a sampled value of said first signal determined in said sampling step;
   counting a number of track crossings according to said first signal;
   stopping said transducer on said destination track once an appropriate number of track crossings have been counted.

2. The method for performing a seek as claimed in claim 1 wherein said track number crossings are determined by counting a number of periods of said first signal.

3. The method for performing a seek as claimed in claim 1 wherein for each period of said first signal, said head is moved a plurality of tracks, thereby extending said seek operation's dynamic range.

4. The method for performing a seek as claimed in claim 1 wherein said disk storage system comprises an optical disk drive system, said head comprises a lens for focusing a light beam, and said disk comprises an optical disk.

5. The method for performing a seek as claimed in claim 1 wherein said first electronic signal comprises a sawtooth waveform having at least one ramp.

6. The method for performing a seek as claimed in claim 5 wherein for each ramp, said head is moved across one track such that velocity for said head is controlled by varying said ramp's period and acceleration for said head is controlled by the rate said period is varied.

7. The method for performing a seek as claimed in claim 6 wherein said ramp period is controlled by a microprocessor.

8. The method for performing a seek as claimed in claim 7 wherein said microprocessor counts track crossings by incrementing a register each time a ramp is generated.

9. The method for performing a seek as claimed in claim 8 wherein said second signal is a sinusoidal Position Error Signal and said sawtooth waveform is sampled each time said Position Error Signal crosses a reference voltage with correct slope.

10. The method for performing a seek as claimed in claim 9 wherein said adjusting step includes supplying more current to a tracking motor coil if said head is lagging and supplying less current to said tracking motor coil if said head is leading, said sampled first signal determining said current supply.

11. In a disk storage system having at least one disk containing a plurality of tracks for storing digital data, an apparatus for positioning a read/write head from a first track to a second track, comprising:
    a processor for determining a location of said first track;
    a generator coupled to said processor for generating a first periodic signal which is independent from information contained on said disk;
    movement means for storing said head at a velocity specified by said first signal;
    sampling means coupled to said generator for sampling said first signal at times specified by a second signal derived from information read off said disk and having an amplitude proportional to relative distances of said head to a nearest track center;
    adjustment means for adjusting said velocity of said head according to said sampled first signal;
    counting means coupled to said processor to count track number crossings based on said first signal;
    means for stopping said head on said second track once an appropriate number of track crossings have been counted.

12. The apparatus as claimed in claim 11 wherein said counting means determines track number crossings by counting a number of periods of said first signal.

13. The apparatus as claimed in claim 11 wherein said movement means moves said head a plurality of tracks for each period of said first signal, thereby extending said seek operation's dynamic range.

14. The apparatus as claimed in claim 11 wherein said disk storage system comprises an optical disk drive system, said head comprises a lens for focusing a light beam, and said disk comprises an optical disk.

15. The apparatus as claimed in claim 11 wherein said first electronic signal comprises a sawtooth waveform having at least one ramp.

16. The apparatus as claimed in claim 15 wherein for each ramp, said movement means moves said head across one track such that velocity for said head is controlled by varying said ramp's period and acceleration for said head is controlled by the rate said period is varied.

17. The apparatus as claimed in claim 16 wherein said processor counts track crossings by incrementing a register each time a ramp is generated.

18. The apparatus as claimed in claim 17 wherein said second signal is a sinusoidal Position Error Signal and said sawtooth waveform is sampled each time said Position Error Signal crosses a reference voltage.

19. The apparatus as claimed in claim 18 wherein said adjustment means supplies more current to a tracking motor coil if said head is lagging and supplying less current to said tracking motor coil if said head is leading, said sampled first signal determining said current supply.

20. A disk storage system having at least one disk containing a plurality of tracks for storing digital data, a head for accessing said digital data, a circuit for performing a seek wherein said head is moved from a starting track to an ending track, said circuit comprising:
an ideal signal generator for generating an ideal, time-varying electronic signal;
a microprocessor coupled to said generator for controlling a frequency of said ideal signal and for counting a number of cycles of said ideal signal;
a means for positioning said head according to said ideal signal such that as said frequency of said ideal signal is increased, said head is moved faster and as said frequency of said ideal signal is decreased, said head is moved slower, and wherein said head is moved across a constant number of tracks for each cycle of said ideal signal.
a position error generator for generating a position error signal having an amplitude which is proportional to a distance of said head to a nearest track center; and
a sample and hold means for sampling and holding said ideal signal each time said position error signal crosses a reference voltage corresponding to said head being physically positioned over a track center, wherein a sampled value of said ideal signal is used to specify a current supplied to said positioning means in order to compensate for servo position errors.

21. The disk storage system as claimed in claim 20 wherein said positioning means positions said head a plurality of tracks for each cycle of said ideal signal, wherein dynamic range is extended.

22. The disk storage system as claimed in claim 20 wherein said disk storage system comprises an optical disk drive system, said head comprises a lens for focusing a light beam, and said disk comprises an optical disk.

23. The disk storage system as claimed in claim 20 wherein said ideal signal comprises a sawtooth waveform having at least one ramp.

* * * * *